United States Patent [19]

Wills et al.

[11] Patent Number: 4,565,512

[45] Date of Patent: Jan. 21, 1986

[54] RAM EXTRUDERS

[75] Inventors: Peter R. Wills, Somersham; Richard C. Cowley, Ely, both of England

[73] Assignee: Barwell Machine and Rubber Group Limited, United Kingdom

[21] Appl. No.: 611,747

[22] Filed: May 18, 1984

[30] Foreign Application Priority Data

May 23, 1983 [GB] United Kingdom ............... 8314218

[51] Int. Cl.[4] .............................................. B28B 17/00
[52] U.S. Cl. .................................... 425/190; 100/179; 264/101; 264/102; 264/142; 264/176 R; 264/323; 425/203; 425/324.1; 425/376 R; 425/DIG. 243; 366/78; 366/139
[58] Field of Search ............... 264/101, 102, 120, 142, 264/176 R, 323, DIG. 69; 425/190, 203, 208, 376 R, DIG. 243; 366/76, 77, 78, 139; 100/179; 198/425, 460, 461, 572, 575

[56] References Cited

U.S. PATENT DOCUMENTS 3,040,654 6/1962 Opie ..................................... 100/179

3,192,561 7/1965 Archer et al. ..................... 425/324.1

FOREIGN PATENT DOCUMENTS 1141033 1/1969 United Kingdom .

Primary Examiner—Jay H. Woo
Assistant Examiner—Timothy W. Heitbrink
Attorney, Agent, or Firm—Roylance, Abrams, Berdo & Goodman

[57] ABSTRACT

The disclosure relates to a ram extruder including an extruder barrel having an extrusion die at one end and a hydraulic ram at the other end having a piston which is advanced along the barrel by the ram to displace material in the barrel through the extrusion die. To facilitate loading of the barrel a loading port is provided in the side of the barrel adjacent said other end of the barrel through which the barrel may be charged after retraction of the piston following an extrusion operation and a port closure device is provided to close the port after extrusion and evacuate air from the barrel prior to advancing the piston past the port to minimize the air contained in the barrel prior to the extrusion operation.

14 Claims, 4 Drawing Figures

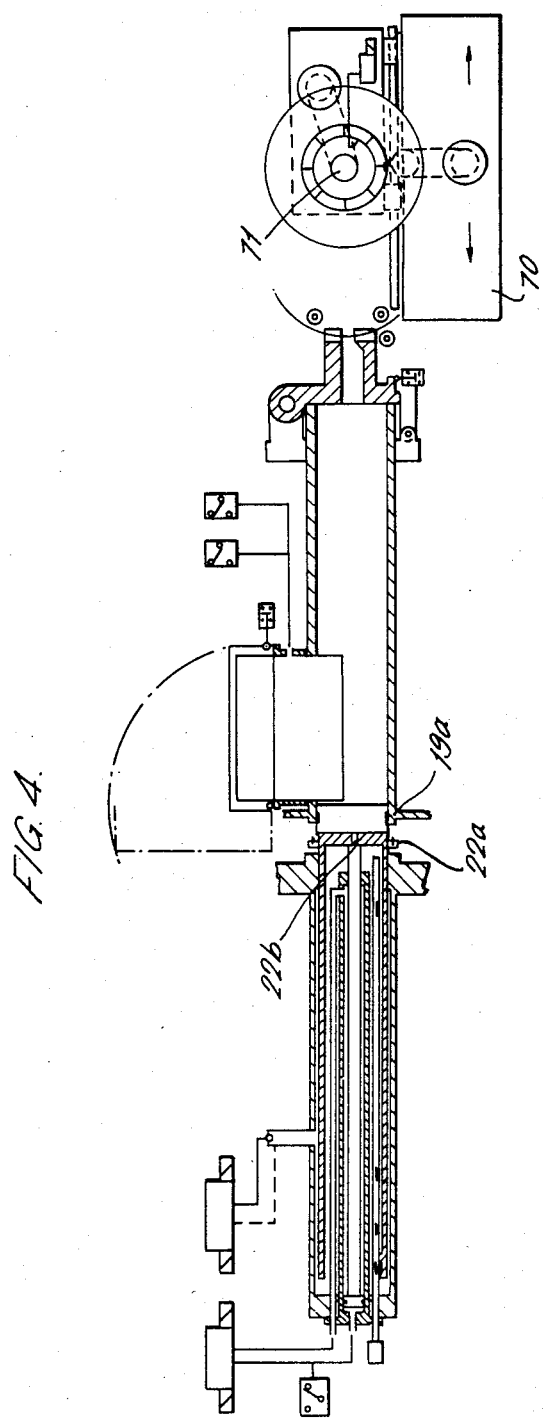

RAM EXTRUDERS

BACKGROUND OF THE INVENTION

1. Field of the Invention

This invention relates to ram extruders for extrusion of plastic material such as rubber.

2. Description of the Prior Art

U.K. Pat. No. 1141033 describes and illustrates a ram extruder comprising an extruder barrel to receive a charge of material to be extruded, a die at one end of the barrel having a die opening equivalent in cross-section to the required cross-section of the material to be extruded and a hydraulic ram at the other end of the barrel having a plunger which is advanced by the ram along the barrel to extrude the material in the barrel through the die opening to be formed into an extrudate of cross-section determined by the die.

In order to load the barrel with a charge of the material to be extruded it is necessary to open the barrel at the die end and load-pre-heated charges of material to be extruded into the barrel manually after which the barrel is closed, a vacuum cap is applied enabling evacuation of air from the barrel to avoid inclusion of excessive air pockets in the extrudate. The loading of the barrel is a cumbersome and unpleasant operation since the charges of material are heavy and are also hot having been pre-heated ready for extrusion. It has been proposed to provide a screw-extruder for feeding material to be extruded to the barrel adjacent the ram end of a hydraulic ram extruder and to provide a valving arrangement for the piston or plunger of the ram to allow material to pass to the forward side of the piston as the piston retracts along the barrel after an extrusion operation. Screw-extruders however have relatively low volume flow rates and so a very substantial screw-extruder would be required to fill an extruder barrel at anything like the rate at which a hydraulic ram could empty the barrel. Moreover screw-extruders are expensive in relation to ram extruders of equivalent output and so the overall costs of a ram extruder equipped with a screw-extruder for filling the barrel of the ram extruder would be considerable. Furthermore, it is difficult to ensure even heating of the compound using a screw extruder and also the range of compounds which may be used in screw extruder is restricted.

SUMMARY OF THE INVENTION

This invention provides a ram extruder having an extruder barrel to receive material to be extruded, an extrusion aperture at one end of the barrel, a loading port in the barrel located towards the other end of the barrel, a piston in the barrel, drive means to advance the piston from a retracted position located beyond the loading port from one end of the barrel to advance the piston along the barrel towards one end to extrude material in the barrel through an extrusion aperture and to return the piston to the retracted position at the end of the extrusion operation and means to close the port in the barrel and to evacuate air from the barrel prior to advancing of the piston past the loading port for an extrusion operation.

The loading port in the barrel provides a convenient means through which charges of material can be loaded in the extruder barrel by a simple mechanical device for transferring charges of material from a storage location adjacent the barrel to the port in the barrel.

BRIEF DESCRIPTION OF THE DRAWINGS

FIG. 4 is a similar view of FIG. 1 showing an extruder adapted for tyre building for subsequent remoulding.

DESCRIPTION OF THE PREFERRED EMBODIMENT

Figure 1:
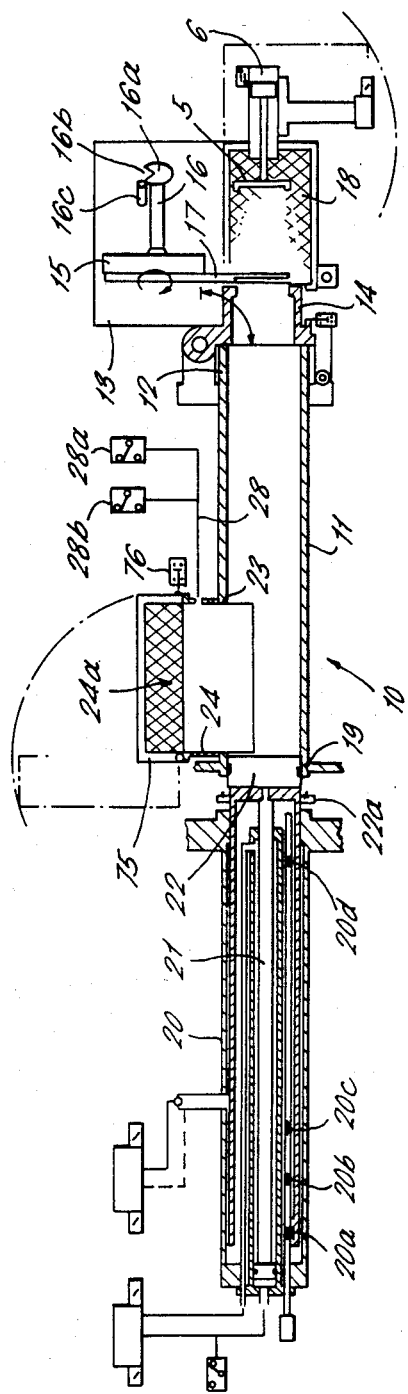
FIG. 1 is a diagrammatic sectional view through a hydraulic ram exterior having a side loading arrangement for the extrusion barrel.

The drawings illustrate a hydraulic ram extruder indicated generally at 10 and comprising an extruder barrel 11 to one end 12 at which is hinged a head assembly 13 which includes a die holder 14 in which an extrusion die (not shown) is mounted. The various micro-switches, vacuum pressure switches, control switches and solenoids for controlling the various functions of the extruder as described below are arranged to provide a signal to or are controlled by a micro-processor for controlling the operation of the extruder as a whole in accordance with a predetermined programme. A motor driven drive shaft 16 is mounted on the head assembly to one side of the extrusion die and a flywheel 15 is mounted on one end of the shaft adjacent the die and carries a knife 17 arranged to sweep across the die face with rotation of the flywheel to sever extrudate as it emerges from the die. The drive shaft 16 for the flywheel 15 carries, at its other end, a disc 16a from which the sector 16b is cut. A photo electric cell system 16c is adjacent the disc to register the cut-out sector 16b when the knife 17 on the flywheel 15 is in front of the die aperture. The signal from the photo electric cell system is used to prevent initiation of the ram extruder 10 when the knife is stationary in front of the die to avoid damage to the knife by the extrudate emerging from the die. Once the knife has been advanced out of the path of the die the beam of the photo-electric cell system is broken by the disc 16a the extruder 10 can then be energised. The die cutter assembly are enclosed in a safety cage 18 locked into position during operation of the mechanism.

A closure cap 5 is provided for said one end of the extruder barrel when the barrel is being filled with a fresh charge of material to be extruded and this is required to evacuate air from the barrel. Closure cap 5 is mounted in front of the open end of the extruder barrel beyond the path of the knife 17 and is moved into and out of engagement with the end of the extruder barrel by a double acting ram 6. A vacuum port connected to a vacuum drawing system is provided in the die holder head at the end of the extrusion barrel to draw vacuum at the very front of the barrel when the front end of the barrel has been closed by the cap 5 during the charging cycle for the barrel as described later.

At the other end 19 of the barrel 11 a hydraulic ram cylinder 20 is mounted axially aligned with the extrusion barrel. A piston rod 21 extends from the cylinder carrying a piston 22 which engages in the extrusion barrel. The hydraulic ram is constructed generally as described and illustrated in our U.K. Pat. No. 1141033 to which reference should be made for a detailed description of the hydraulic circuitry associated with the ram. As described in that specification, the ram is double acting and has a pump system for supplying hydraulic fluid pressure to the ram to advance and retract the piston 22 along the cylinder. The ram has a double piston arrangement to enable the piston to be advanced at speed to compact the material to be extruded in the barrel and then by means of a volume control system to extrude material from the barrel at a constant volume flow rate. The piston 22 has a vacuum port concealed behind a flexible valve plate mounted on the forward side of the piston through which vacuum can be drawn from the space in the extruder barrel in front of the piston prior to the carrying out of an extrusion operation. The valve plate is such that when the piston bears on the material in the extruder barrel to be extruded, the valve plate is pressed against the surface of the piston to cover the vacuum port.

The other end 19 of the extruder barrel 11 is spaced from the adjacent end of the ram cylinder 20 and a floating sealing ring 22a is slidably mounted on the piston ram between the ram cylinder and extrusion barrel for sealing engagement with the end 19 of the barrel. When the ram piston is retracted in the extrusion barrel, the sealing ring 22a is dis-engaged from the end of the extrusion barrel and moves into a position adjacent the ram cylinder. Then the ram piston is moved forwardly in the extrusion barrel from the fully retracted position illustrated in FIG. 1, the sealing ring 22a moves forward with the ram into sealing engagement with the end of the extrusion barrel and when vacuum is drawn in the extrusion barrel as described later, the action of the vacuum draws the sealing ring more firmly against the end of the extrusion barrel to increase the effectiveness of the seal between the sealing ring and extrusion barrel.

The piston 22 has a central throughway 22b connected to a vacuum pump for drawing vacuum through the piston from the front face thereof prior to an extrusion operation.

The cylinder body contains four reed switches for controlling the operation of the ram referenced 20a, 20b, 20c and 20d, the switches being connected in a control system of the ram. Switch 20a signals that the ram is fully retracted before loading of the extrusion barrel takes place. Switch 20b allows the ram to move forward into the barrel sufficiently to engage the sealing ring 22a with the rearward end of the barrel 19a. Switch 20c allows the ram to move forward to a position immediately past the aperture 23 of the delivery chute 24 and switch 20d defines the further forward position of the ram in the barrel.

Figure 2:
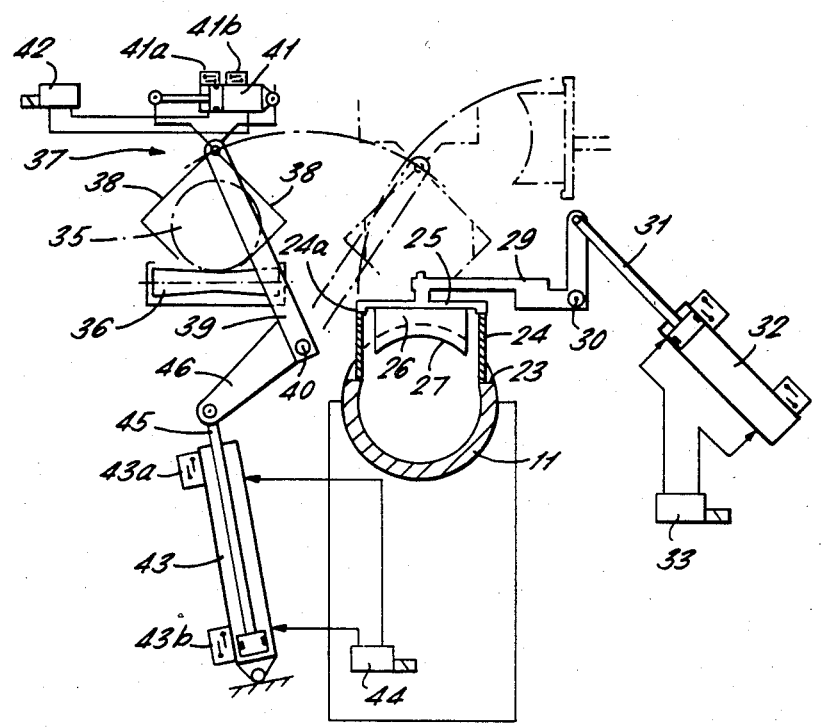
FIG. 2 is a cross-section through the extruder barrel illustrating the loading arrangement.

The extrusion barrel 11 has, adjacent the end 19, a loading station where pigs of rubber or other extrudable materials are fed to the barrel as illustrated in FIG. 2 of the drawings to which reference will now be made.

The barrel is formed adjacent the end 19 with a rectangular aperture in the top part of the barrel and a rectangular feed chute 24 is mounted on the barrel over the aperture. The feed chute 24 is formed with a port 24a at its upper end through which pigs of rubber are delivered to the chute and thence into the barrel. A closure cap 25 is provided for closing the port 24a the cap having a guide 26 mounted on the underside thereof formed with a concave recess 27 to align with the inside surface of the extrusion barrel to assist in guiding a pig of rubber deposited in the barrel through the chute forwardly from the aperature 23 along the barrel under the action of the ram as described earlier.

Referring again to FIG. 1 of the drawings the chute 24 has a vacuum line 28 connected to it. The line 28 leads to a source of vacuum, a pressure switch 28a and a pressure switch 28b. Pressure switch 28a is connected to the vacuum line to sense when the vacuum has been drawn down to a certain level and switch 28b senses when vacuum is released. Vacuum is drawn in the barrel when the chute is closed by the cap 25 during the loading cycle as described below.

The cap 25 is mounted on a pair of levers 29 (only one of which is shown) pivoted at 30 about an axis extending parallel to the extrusion barrel. A piston rod 31 of a double-acting pneumatic ram 32 charged through a solenoid control valve 33 acts through a toggle mechanism (not shown) on the levers 29 such that the mechanism is "over-centered" when closed by the ram and cannot be opened other than by a retraction of the ram. The pneumatic cylinder has a magnetic reed switch sensor (15.4 in FIG. 2) which is positioned to detect when the cap is fully closed and, through the control circuit for the ram, to allow the ram to advance past the aperture 23.

Spring loaded limited lost motion bolt connections are provided between the caps 25 and levers 29 so that if the cap is obstructed in its closing movement by a misplaced or oversized pig, the arm 29 can be moved by its ram 32 into the fully closed position without damaging the cap or arm. A sensor (not shown) is provided on the arm 29 to be actuated by the cap 25 if the latter is displaced with respect to arm against the spring action due to a misplaced or over-sized pig and the sensor is arranged to provide a signal to the control system to render the ram inoperative so that the ram does not move forwards to force the pig along the barrel.

A pig of rubber or extrudable material in generally cylindrical form to fit into the extrusion barrel 11 through the port 24a is indicated at 35 in FIG. 2 and is supported on a conveyor 36 which will be described in greater detail below. A grab indicated at 37 having pincer arms 38 is supported between spaced swing arms 39 pivoted at 40 to pick up the pig 35 from the conveyor and transport it to the port in the extrusion barrel. The swing arms 39 are pivoted between a position over the conveyor 36 and a position indicated in dotted outline over port 24a and the barrel 11 by means of a double acting pneumatic ram 43 energised by a valve 44 and having a piston rod 45 connected by a lever 46 to the swing arms 39. The ram 43 has micro-switches 43a, 43b to detect when the piston rod 45 reaches the limits of its travel.

The pincer arms 38 are opened and closed by a double-acting pneumatic ram 41 energised by a solenoid controlled valve 42. The ram has limit switches 41a and 41b triggered when the ram has extended and contracted respectively to open and close the pincer arms 38. The limit-switches 41a and 41b are connected in the control system for the apparatus. Limit-switch 41b is triggered by retraction of the arm to close the pincer arms and is positioned so that it is not triggered unless the arms close sufficiently on the pig between the arms to ensure that the pig is of a size which can be accommodated by the extrusion barrel. Thus, if an oversize pig is engaged by the grab, the arms will not close sufficiently to trigger the limit-switch 41b and the solenoid 44 will not be operated to swing the grab from its position over the conveyors to a position over the barrel to deposit the pig in the barrel. If the pig is correctly sized, the limit-switch 41b is triggered on closure of the pincer arms 38 and the ram 43 is then energised to swing the grab over the port 24a of the delivery chute 24 into the extruder barrel. Micro-switch 43a on ram 43 is then triggered and this in turn, initiates operation of solenoid valve 42 to cause ram 41 to open the pincer arms releasing the pig into the delivery chute of the extruder barrel which in turn triggers the limit-switch 41a which operates solenoid 44 the ram 43 and returns the grab to its position over the conveyor to receive the next pig.

Figure 3:
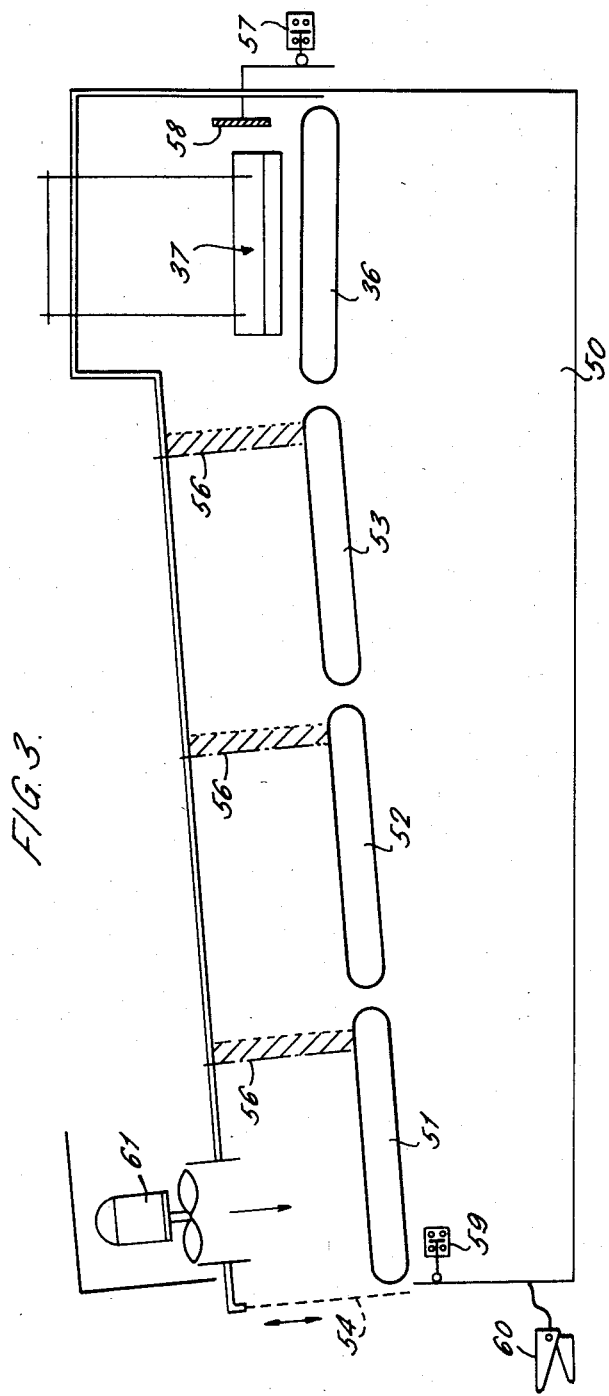
FIG. 3 is a diagrammatic view of a conveyor feed system to the loading station.

A conveyor 36 forms the last stage in a pig transporting and heating system illustrated in FIG. 3 to which reference will now be made. An enclosure 50 is disposed alongside the extruder and contains three separate conveyors 51, 52 and 54 disposed end to end and arranged in a slight incline leading to a fourth conveyor 36. A slidable door 54 is provided at one end of the enclosure 50 to enable a pig of material to be disposed on the conveyor 51 it is located adjacent that end of the conveyor. A gate is provided in the opening to the enclosure to restrict the size of pig which can be inserted in the enclosure for delivery to the extruder barrel to a size which the barrel can accommodate. Each of the conveyors 51 to 53 has a photo-electric cell arrangement 56 to detect the presence of the leading end of the pig at the discharge end of the conveyor to switch off the motor drive for the conveyor. The final conveyor 36 has a limit switch 57 operated mechanically by a detector member 58 disposed adjacent the discharge end of the conveyor 36 to switch off the conveyor when the leading end of the pig on the conveyor hits the detector member. The limit switch 57 is also arranged to energize conveyor 53 next to conveyor 36 when there is no pig present on the conveyor 36 to deliver any pig present on the conveyor 53 to the conveyor 36 as soon as the grab has returned to its position over conveyor 36 and the limit-switch 41a has signalled that the arms 38 are fully open and the micro-switch 43b has signalled that the grab 37 is over the conveyor 36. The photo-electric cell arrangement 56 of the conveyor 53 is arranged to operate conveyor 52 in a similar manner as does the switch of conveyor 52 to energise conveyor 51. Thus entry of a pig once the conveyor 51 will cause the pig to be passed from one conveyor to the next until it reaches the conveyor 36. If there is already a pig on the conveyor ahead in the series, the pig will remain in a position on its present conveyor until the next conveyor is freed and will then be transported to the next conveyor. Thus the arrangement of conveyors provides a system for regulating the flow of pigs to the final conveyor 36 from where they are picked up by the grab 37 one by one and deposited in the extrusion barrel.

A limit switch 59 is provided on the door aperture 54 responsive to closure of the door to operate the conveyor system. A foot switch 60 is provided for operating the first conveyor 51 only for feeding a pig of rubber on to the conveyor. A pig of rubber is placed on the conveyor 51 through the open door aperture and the foot switch 60 is depressed to run the conveyor 51 which then draws the pig up the conveyor until the leading edge of the pig breaks the beam of the photoelectric cell 56. If the pig is of a correct length, the door 54 will close behind the pig operating the limit switch 59 which sets in motion the full conveyor system to move the pig to the conveyor 52 thence to the conveyor 53 and finally to the conveyor 36. If however the pig is too long, the door does not close in the aperture and the limit switch 59 is not tripped so that the pig remains static on the conveyor 51 and can be removed for trimming.

Finally a heating system (not shown) with a forced air circulation provided by a motor-driven fan 61 is provided for maintaining pigs supplied to the delivery enclosure at a suitable temperature for extrusion. The pigs are pre-heated prior to supply to the extruder in a water bath or by other means.

By way of example, a charging cycle for the barrel in which two pigs are loaded into the barrel is as follows:
1. The ram piston 22 is retracted to the rearward end 19 of the extrusion barrel 11 as illustrated in FIG. 1.
2. The grab mechanism is operated to lift a pig of rubber from the conveyor 36 to a position over the delivery chute and the arms of the grab are opened to release the pig into the barrel.
3. The grab returns to its position over the conveyor 36 with the arms fully open to receive the next pig.
4. The cap 25 is closed over the port.
5. The ram piston is advanced to push the pig forwardly into the extrusion barrel past the aperture 23 until the switch 20c is triggered by the ram piston.
6. The ram piston then retracts to the rearward end of the extrusion barrel and the cap 25 is open.
7. The grab mechanism is operated to lift a second pig of rubber from the conveyor 36 to a postion over the delivery chute and the arms of the grab are opened to release the pig into the barrel.
8. The cap 25 is closed over the port in the delivery chute 24 and the cap 5 at a front end of the barrel is closed. Vacuum is drawn in the extrusion barrel 11 to evacuate substantially all the entrapped air therein through the vacuum line 28 connected to the delivery chute 24, through the ram piston 22 and from the front end of the extrusion barrel.
9. The ram piston is advanced until the ram actuates the switch 20b and in so doing the sealing ring 22a is engaged with the end 19 of the extrusion barrel 11 to seal the end of the barrel. When the vacuum drawn in the extrusion barrel has reached the required level as sensed by the pressure switch 28a, the ram piston 22 is advanced in the extrusion barrel to push the second pig forwardly and compress both pigs within the extrusion barrel past the aperture 23.
10. The vacuum switch is switched off when the ram compresses the material in the extruder barrel to a pre-determined pressure.
11. The cap 25 is raised from the delivery chute 24 and the front end cap 5 is retracted from the extrusion barrel after the release of vacuum pressure has been sensed by the pressure switch 28b.

The extruder is then ready for the extrusion operation to commence.

It will be appreciated that the procedure for loading a single pig in the barrel will be similar to that described above except that the ram piston is advanced and vacuum in drawn in the extruder barrel immediately after the first pig has been loaded.

The extruder may be used to sever the extrudate into individual pieces of a predetermined volume and shape according to the die provided in the die holder, or can be used to extrude a dimensionally accurate layer of rubber onto a prepared tyre carcass to form a tread layer on the carcass as illustrated in FIG. 4 for subsequent remoulding. In this arrangement, the cutter and flywheel arrangement are replaced by a base 70 supporting a motor driven mounting 71 for carrying the tyre carcass to be provided with a tread layer. A special die is used to extrude rubber to the required profile on to the carcass which is rotated immediately adjacent the die outlet for material to be extruded directly onto the carcass. The arrangement of applying tread material directly onto a tyre carcass by extrusion is described in more detail in U.K. Pat. Nos. 1353903 and 1590378.

The filling arrangement for the extruder barrel described above provides faster filling with less manual work required as compared with conventional arrangements for filling a ram operated extruder barrel which involve opening the front of the extruder and loading pigs of material into the barrel.

The apparatus described above includes a heated enclosure for the pre-heated pigs of material supplied to the barrel. That arrangement is not essential and may be dispensed with and the pigs are then loaded manually into the barrel through the chute 24. A safety cover 75 hinged to the barrel (see FIG. 1) is then provided for the chute 24. The cover trips a switch 76 when it is in the closed position when it is arranged in the control system to the ram to allow the ram to advance along the barrel.

We claim:

1. A ram extruder, comprising:
   an extruder barrel to receive material to be extruded, said extruder barrel having a first and a second end,
   an extrusion aperture at said first end of the barrel,
   a loading port located towards said second end of the barrel,
   a piston slidably received by the barrel,
   drive means to advance the piston from a retracted position located beyond the loading port approximate said second end of the barrel to advance the piston along said barrel towards said first end to extrude material in the barrel through the extrusion aperture and to return the piston to the retracted position at the end of the extrusion operation,
   means to close the loading port in the barrel,
   means to evacuate air from the barrel through the closing means prior to the advancing of the piston past the loading port for an extrusion operation, and
   a vacuum passageway in said piston through which air is extracted from the barrel from in front of the piston as the piston advances along the barrel.

2. A ram extruder as claimed in claim 1 wherein the means to close the port in the barrel comprises a closure cap to fit the port in the barrel and means to move the cap into and out of engagement with the port.

3. An extruder as claimed in claim 1 wherein the barrel has a vertically extending delivery chute adjacent said second end having said loading port at the upper end thereof and an aperture into the barrel at the lower end thereof.

4. An extruder as claimed in claim 2 wherein the means for moving the closure cap comprises a ram acting through a lever mechanism connected to the cap to swing the cap into and out of engagement with the port with extension and retraction of the ram.

5. A ram as claimed in claim 4 wherein a lever is hinged about an axis extending parallel to the extrusion barrel so that the cap is swung in an arc extending upwardly and to one side of the barrel when it is disengaged from the barrel.

6. An apparatus as claimed in claim 1 wherein means are provided for supporting a charge of material to be inserted in the extrusion barrel to one side of the barrel adjacent the port and grab means are provided for lifting the charge of material and depositing it to the port into the barrel.

7. An extruder as claimed in claim 6 wherein the grab is mounted on a swing arm pivotal about an axis extending parallel to the barrel and power means are provided for swinging the arm to move the grab between a position over the support means to receive and gauge a charge of material and a position over the port in the barrel to deposit a charge into the barrel.

8. An extruder as claimed in claim 7 wherein the power means comprise a double acting ram.

9. An extruder as claimed in claim 7 wherein the grab comprises a pair of hinged jaws for engaging and releasing a charge of material having a double acting ram for opening and closing the jaws and means are provided to gauge the extent of closure of the jaws to inhibit operation of the power means to swing the jaws over the barrel if the charge of material is gauged to be of a greater than predetermined size.

10. An extruder as claimed in claim 6 wherein the means to support a charge of material adjacent the port in the barrel comprise conveyor means to hold a number of charges of material and to deliver them one by one to a discharge section adjacent to the port in the barrel to be collected by the grab means and transferred to the barrel.

11. An extruder as claimed in claim 10 wherein conveyor means are located in an enclosure having heating means for maintaining the temperature of pre-heated charges of material to be extruded.

12. An extruder as claimed in claim 10 wherein the conveyor means comprises a series of separate conveyors located end to end each conveyor having a control means to determine whether a charge of material is located on the conveyor towards the discharge end of the conveyor means and to operate the conveyor means to advance the charge of the material to the next conveyor means when no charge is detected on the next conveyor means.

13. An extruder as claimed in claim 1 wherein the piston of the extruder is operated by a double acting hydraulic ram.

14. An extruder according to claim 1 further comprising means connected to said vacuum passageway for drawing air from in front of the piston through said passageway.

* * * * *